July 14, 1964     M. D. MARTIN     3,140,900
MEANS FOR REDUCING SHAFT DEFLECTION
Filed April 2, 1962     2 Sheets-Sheet 1
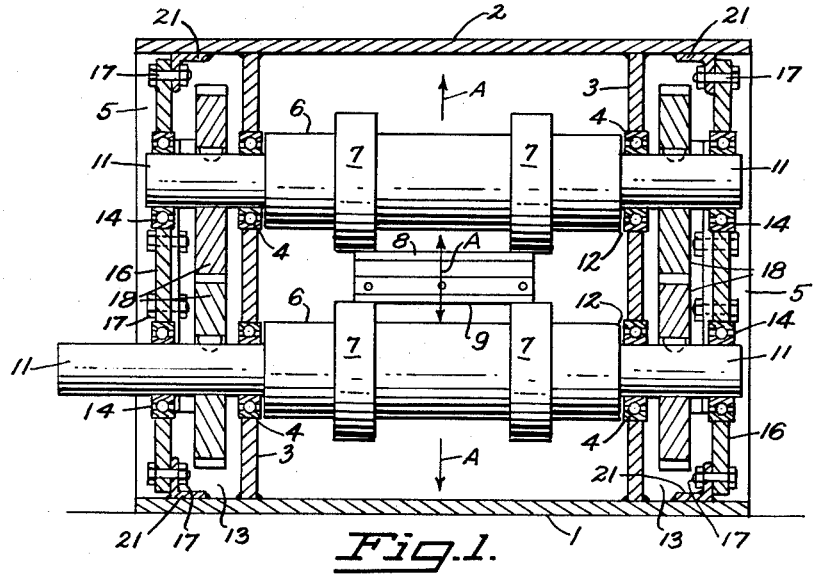
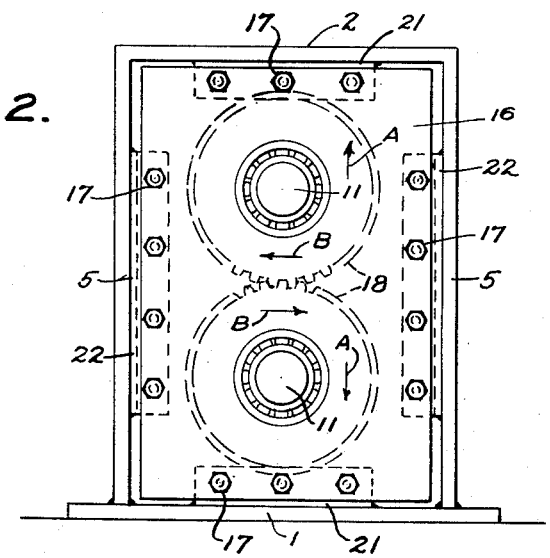
INVENTOR.
MERRILL D. MARTIN
BY George B White
ATTORNEY

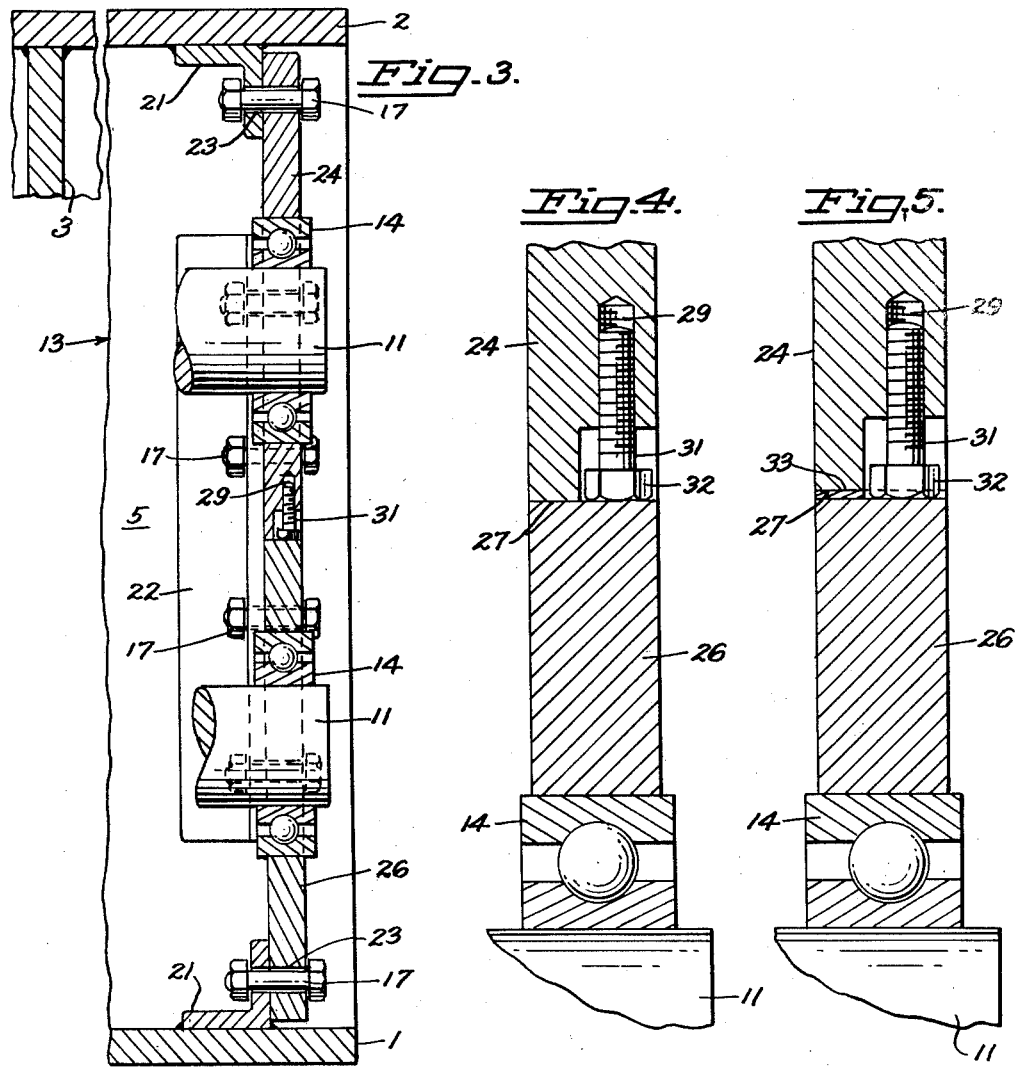
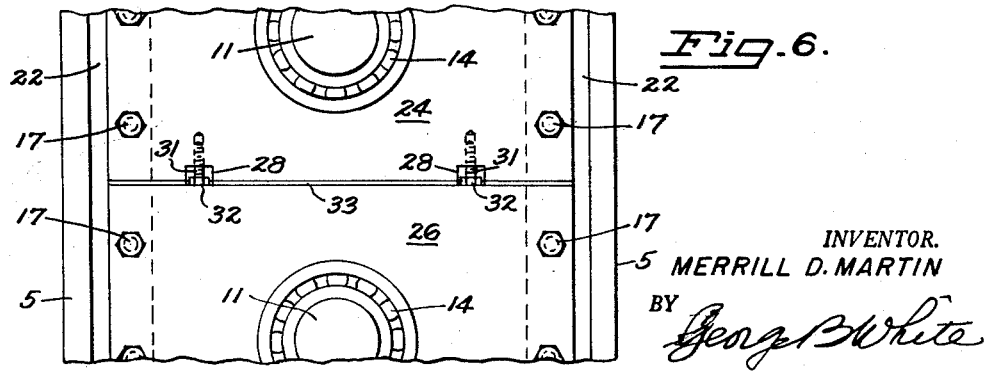

United States Patent Office

3,140,900
Patented July 14, 1964

3,140,900
MEANS FOR REDUCING SHAFT DEFLECTION
Merrill D. Martin, Oakland, Calif.
(1250 67th St., Emeryville, Calif.)
Filed Apr. 2, 1962, Ser. No. 184,319
4 Claims. (Cl. 308—22)

An object of the invention is to provide means whereby shaft bowing in various directions in rotating machinery, such as rotary shear cutters, is materially reduced so as to dampen shaft vibration, bounce and oscillation and to extend the life of tooling in such machinery and enable operation at higher speeds than permitted in such machines previously.

Another object of the invention is to provide means for reducing shaft bowing, particularly in rotary shear cutters, specially of shafts mounted in pairs; said means including shaft extensions at each end beyond the usual bearings and providing secondary bearings for said extensions so tied together as to form a cantilever support effect at each end of each shaft and resist bending forces materially.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of said said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view of a rotary shear cutter with my bearing arrangement.

FIG. 2 is an end view of said rotary shear cutter.

FIG. 3 is a fragmental partly sectional view on a somewhat enlarged scale of a modified form of the invention illustrating the step of prestressing, namely the loose mounting of the outer bearing plates.

FIG. 4 is an enlarged fragmental sectional view showing the arrangement of the jack-screw for prying the split bearing plates apart.

FIG. 5 is a fragmental sectional view showing the jack-screw stressed and an enlarged view of the shim in the space between the plates.

FIG. 6 is a fragmental end view of the machine with the split plates showing the location of the jack-screws.

In the illustrative embodiment herein the means for reducing shaft deflection is shown in a rotary shear cutter.

The usual parts of a rotary shear cutter pertinent to the understanding of the features of the herein invention are a base frame member 1 and a top frame member 2, connected by vertical bearing plates 3, in each of which are a pair of bearings 4 to journal a pair of parallel shafts 6. On the shafts 6 are provided the usual cylindrical roller elements 7 for mounting coacting dies 8 and 9 in general tangential relation as shown and described in the copending application of George M. Martin, for Backlash Preventing Gears for Coupled Driven and Drive Shafts, Serial No. 812,407 filed on May 11, 1959. The gearing in said copending application successfully reduced shaft crossing or frame twist.

For reducing the shaft bowing in the various directions, each shaft 6 has at each end thereof a reduced extension 11. The diameter of each reduced extension 11 should be of substantial size relatively to the body of the shaft 6, preferably not less than one-half of the shaft diameter. Each reduced extension 11 is journalled in the usual bearing 4 adjacent the shoulder 12 at the base of the reduced extension 11, and extends beyond the journal 11 through a space 13 into a second or outer bearing 14. The outer bearings 14 are mounted in a vertical tie plate 16 in suitably spaced relation to accommodate the outer ends of the respective reduced extensions 11. The tie plate 16 in turn may be suitably bolted as shown at 17 to the base frame member 1 and to the top frame member 2. Gears 18 on the respective reduced extensions 11 are located in the space 13, as shown, for driving the respective shafts.

The aforedescribed arrangement effects a cantilever support for each end of the shaft 6 and reduces the bending movement of the center of the shaft 6 in practice very substantially. In fact when constructed in accurate detail it may reduce the bending movement of the center of the shaft 6 by eight times from the bending in single bearings. This can be even further refined by prestressing the outer bearings so as to cause reverse deflection.

The shaft 6 when mounted in pairs have a tendency to bow away from one another as indicated by the vertical arrows A which is prevented by the herein construction. The herein means also prevent the ends of the shafts from approaching or receding from one another, and also prevents the shafts from deflection in opposite directions horizontally as indicated by horizontal arrows B.

The construction as herein described has been demonstrated in practice with the result of material dampening or reduction of shaft vibration, bounce, and oscillation; it extended the tooling life in rotary shear cutters and proved to be a breakthrough on ability of this type of machinery to operate at higher speeds than heretofore possible; it enabled such rotary shear cutters to perform so called rotary platen cutting namely cutting with a die rule against a tempered steel anvil the problems of which operation plagued the industry for many years because previously the pressure of the die rule pressing the fibre board or the like and contacting the anvil caused severe shaft deflection and increased bouncing with any increase of speed thus allowable speed in the past was too slow for practical purposes. The herein described invention eliminates said disadvantages and renders such machinery sturdy, speedy, accurate and efficient.

The above advantages are primarily due to the method of supporting the outer ends of the shaft in a cantilever manner which counteracts the bending forces on the shaft.

The aforementioned prestressing may be accomplished in the method illustrated in FIG. 3 to 6 inclusive of the drawings. In this illustration the same bottom plate 1 and top plate 2 are spaced between inner bearing plates 3, and side plates 5 extend between the top and bottom plates 1 and 2 and outwardly or toward the end of the machine from the inner bearing plate 3, at each end. This structure forms a solid box surrounding the space 13, which box is open at the end. Horizontal top and bottom angle irons 21 are welded on the inside faces of the respective plates 1 and 2. Vertical angle irons 22 are welded to the respective side plates 5 of the box so that their flanges extend inwardly of the box as shown in FIG. 2. The securing bolts 17 extend loosely through holes 23 with sufficient clearance to allow for the comparatively small play necessary for prestressing.

In this form instead of using a single outer bearing plate, the plate is split so as to provide a pair of bearing plates 24 and 26. Each half plate 24 or 26 is provided with an outer bearing 14 to accommodate the outer end 11 of the respective shaft 6.

These plates 24 and 26 are substantial and thick. They may be one inch thick. In the lower end of the upper plate 24 adjacent its abutting edge 27 are cut a pair of spaced notches 28 from the abutting edge 27 upwardly so as to form pockets. In the top of each pocket 28 is a threaded hole 29 into which is screwed a jack-screw 31 so that the head 32 thereof bears against the top of the lower plate 26. Thus when the jack-screws 31 are turned so as to be withdrawn from the holes 29 the heads 32 thereof will bear against the top of the lower plate 26 and will pry the plates apart. The enlarged slit is shown on an exaggerated scale in FIG. 5 and it is filled with a suitable shim 33 to positively hold the plates 24 and 26 in the adjusted prestressing attitude.

The method of prestressing with the above construction involves the steps of providing the outer bearings for the aforementioned cantilever arrangement.

The tie plate or outer bearing plate is split horizontally into two halves and is formed with the rough holes for the outer bearings. The butt edges of the plates are finish machined and are butted together and clamped in a superimposed relation over the respective inner bearing plates 3. Then bearing holes are bored through the superimposed plates so as to provide matching bearing holes in the inner and outer plates. The bolt holes 23 for the bolts 17 are then drilled or bored. The pockets 28 are notched into the lower end of the upper plate 24 as shown in FIGS. 3 to 6 and the jack-screws 31 are threaded into the tops of the respective pockets 28. Then the bearings are assembled in the respective bearing holes and the plates are placed over the ends of the shafts 11 and the bolts 17 are loosely assembled to support the plates 24 and 26 in butting relation to one another. Then the jack-screws 31 are turned at both ends of the machine until the plates and the ends of the shafts therein are pried apart for the desired prestressing. Then suitable shims 33 are forced into the split between the butting ends of the plates 24 and 26, the bolts 17 are tightened and the jack-screws 31 are loosened or released.

In the above manner the prestressing can be so determined that it effectively reacts to the anticipated bending forces on the respective shafts.

I claim:

1. Means for reducing shaft deflection in rotary devices having parallel coacting shafts, comprising:
   (a) a fixed inner bearing support at each end of the coacting shafts
   (b) a pair of spaced inner bearings fixed in each inner bearing support in axial alignment with the coacting shafts in the operating position of said shafts
   (c) a reduced extension on each end of each shaft extended through and journalled in the adjacent spaced inner bearing
   (d) a pair of outer bearing plates spaced from said fixed inner bearings
   (e) an outer bearing fixed in each outer bearing plate initially in axial alignment with the adjacent shaft and journalling the outer end of the adjacent reduced extension
   (f) jack means between each pair of adjacent bearing plates for prying apart said outer bearing plates with the outer ends of the respective reduced extensions therein thereby to selectively prestress said shafts
   (g) and means to fasten said pairs of plates in said prestressing position fixedly relatively to the respective fixed inner bearing supports.

2. Means for reducing shaft deflection in rotary shear cutters having parallel coacting shafts, comprising
   (a) a box formed for journalling the ends of the shafts
   (b) each shaft having a reduced extension extended through the adjacent box
   (c) the diameter of each reduced extension being at least equal to half of the shaft diameter
   (d) an inner bearing plate on each box
   (e) spaced bearings on each bearing plate to journal the respective reduced ends near the shaft
   (f) top and bottom plates extended outwardly from said inner bearing plate away from the adjacent inner bearing plate
   (g) fixed side plates closing the sides of said box between said top and bottom plates
   (h) a pair of outer bearing plates in each box
   (i) means to support said outer bearing plates in said box so that the adjacent horizontal edges thereof are in abutting relation
   (j) outer bearings in the respective outer plates in alignment with the respective inner bearings when said horizontal edges of the outer bearing plates are abutted together
   (k) and means to pry said outer bearing plates apart with the outer ends of the shafts therein selectively to prestress said shafts.

3. The invention defined in claim 2 wherein said prying means comprise
   (a) spaced pockets formed in the butting end of at least one of said outer bearing plates
   (b) a jack element adjustably secured in said pocket in one of said outer bearing plates so as to bear against the butting of the other outer bearing plate for selectively prying said plates apart.

4. The method of mounting a pair of shafts for rotary shear cutters to reduce shaft deflection including the following steps:
   (a) forming a box at each end of said rotary shear cutters so that each box is open endwise, outwardly
   (b) forming reduced extensions on the opposite ends of the shafts of said rotary shear cutters
   (c) forming split outer bearing plates
   (d) forming aligned bearing holes in the adjacent outer bearing plates and in the closed end of said box
   (e) loosely mounting the outer bearing plates in spaced relation to the closed box end in said box so as to align the respective bearing holes
   (f) journalling the respective shaft extensions in the respective aligned bearings
   (g) prying apart the adjacent outer bearing plates so as to exert a selected prestressing force on the adjacent reduced extensions for counteracting the anticipated bending forces on the respective shafts,
   (h) and fastening said outer bearing plates to said box in said prestressed attitude.

References Cited in the file of this patent

UNITED STATES PATENTS

| 1,401,784 | Jouffret | Dec. 27, 1921 |
| 2,611,150 | Goulding | Sept. 23, 1952 |
| 2,615,230 | Cluett | Oct. 28, 1952 |
| 2,825,217 | Byrd | Mar. 4, 1958 |
| 2,897,538 | Shapiro et al. | Aug. 4, 1959 |
| 3,037,396 | Martin | June 5, 1962 |

FOREIGN PATENTS

| 747,347 | Great Britain | Apr. 4, 1956 |
| D. 17,588 | Germany | Oct. 25, 1956 |